US007314274B2

(12) United States Patent
O'Donnell et al.

(10) Patent No.: US 7,314,274 B2
(45) Date of Patent: Jan. 1, 2008

(54) COMPOSITIONS AND PROCESSES

(75) Inventors: John O'Donnell, Manchester (GB); Kevin Johnson, Preston (GB); Mark Holbrook, Manchester (GB); Stephen George Yeates, Manchester (GB); Tom Annable, Manchester (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/509,936

(22) PCT Filed: Feb. 27, 2003

(86) PCT No.: PCT/GB03/00833

§ 371 (c)(1),
(2), (4) Date: May 11, 2005

(87) PCT Pub. No.: WO03/082589

PCT Pub. Date: Oct. 9, 2003

(65) Prior Publication Data

US 2005/0225616 A1 Oct. 13, 2005

(30) Foreign Application Priority Data

Apr. 2, 2002 (GB) ................................ 0207655.2

(51) Int. Cl.
*G01D 11/00* (2006.01)

(52) U.S. Cl. ......................... 347/100; 347/95; 523/160

(58) Field of Classification Search ................ 347/100, 347/95, 96, 101; 523/160; 106/31.6, 31.27, 106/31.13
See application file for complete search history.

(56) References Cited

U.S. PATENT DOCUMENTS

| | | | | |
|---|---|---|---|---|
| 2,545,423 | A * | 3/1951 | Duerr | 430/158 |
| 3,428,576 | A | 2/1969 | Fowkes et al. | |
| 6,932,466 | B2 * | 8/2005 | Payne et al. | 347/100 |

FOREIGN PATENT DOCUMENTS

| | | | |
|---|---|---|---|
| EP | 0485079 | A | 5/1992 |
| EP | 485079 | A1 * | 5/1992 |
| EP | 1172224 | A | 1/2002 |
| GB | 1152243 | | 5/1969 |
| WO | WO99/54144 | | 10/1999 |
| WO | WO00/37258 | | 6/2000 |
| WO | WO 02/45971 | A1 * | 6/2002 |

* cited by examiner

*Primary Examiner*—Manish S. Shah

(57) ABSTRACT

An ink-jet printing process comprising the steps (a) and (b) in any order or simultaneously: (a) applying an ink to a substrate by means of an ink-jet printer to form an image on a substrate; and (b) applying to the substrate a fixing composition comprising a liquid medium and a polymer containing a plurality of monoguanide and/or biguanide groups by means of an ink jet printer; characterised in that in the fixing composition has a chloride concentration less than 400 ppm by weight.

15 Claims, No Drawings

COMPOSITIONS AND PROCESSES

This invention relates to ink-jet printing processes, fixing compositions, sets of liquids and cartridges containing these compositions, to printed substrates and to a method for preparing polymonoguanides.

Ink jet printing (IJP) is a non-impact printing technique in which droplets of ink are ejected through a fine nozzle onto a substrate without bringing the nozzle into contact with the substrate.

The demanding performance requirements of ink jet printers and the resultant prints pose a significant challenges for the printer industry. The ink jet printers are required to fire millions of droplets of ink onto substrates without failure or excessive koga (i.e. charred material) build up of the printhead. The resultant prints are required to possess good fastness to environmental challenges such as light and water. The prints also need to dry quickly to avoid them sticking together or smudging.

EP 1,172,224 A1 of Nicca Chemical Company describes recording materials (e.g. papers) carrying polymonoguanide ("PMG") salts to address the problem of ink blotting during printing or on subsequent contact with water. The PMG is made by condensing certain diamines with certain diisocyanates in DMF at 40-60° C. The resultant PMG is uniformly distributed across the entire substrate, e.g. by adding it to the paper pulp or applying it as a coating. As a result large quantities of PMG are used. Furthermore, the presence of PMG over the whole substrate can lead to fixation of unwanted dirt and grease in unprinted areas.

International patent publication WO 00/37258 of Avecia Limited describes an ink jet printing process in which an ink and a composition comprising a binder and polymeric biguanide fixing agent (e.g. PHMB) are applied to a substrate by means of an ink jet printer. The chloride content of the fixing composition is not specified, although this would be expected to be very high due to the inherently high chloride concentration of commercially available PHMB.

Co-pending International patent application PCT/GB01/05381 describes coating compositions comprising a pigment, medium and a binder containing a PMG salt of specified formula. The coating compositions are used to prepare media for in ink jet printing. The PMG salts are either HCl salts or alternative salts prepared from the HCl salt by a process which would inherently leave significant chloride concentrations in the final PMG.

We have now devised an ink jet printing process which can provide high wet-fast prints while at the same time having low tendency to form koga on ink jet printheads and avoiding unnecessary wastage of fixing agent and attraction of stains to unprinted areas.

According to the present invention there is provided an ink-jet printing process comprising the steps (a) and (b) in any order or simultaneously:

(a) applying an ink to a substrate by means of an ink-jet printer to form an image on the substrate; and (b) applying to the substrate a fixing composition comprising a liquid medium and a polymer containing a plurality of monoguanide and/or biguanide groups by means of an inkjet printer;

characterised in that in the fixing composition has a chloride concentration less than 400 ppm by weight.

The fixing composition is preferably applied to the substrate in step (b) such that the concentration of polymer containing a plurality of monoguanide and/or biguanide groups on the substrate when the substrate is dry is up to 20 $g.m^{-2}$, more preferably up to 5 $g.m^{-2}$, especially from 0.1 to 2 $g.m^{-2}$, and more especially from 0.5 to 1 $g.m^{-2}$ in the areas printed with the polymer containing a plurality of monoguanide and/or biguanide groups.

Preferably the polymer containing a plurality of monoguanide and/or biguanide groups is a PMG and/or a polymeric biguanide.

Preferably the fixing composition is applied to the substrate in step (b) by means of the same ink jet printer used to apply the ink to the substrate in step (a).

Preferably the fixing composition of step (b) is applied to the substrate just prior to, or simultaneously with, application of the ink. Preferably the ink jet printer used to apply the ink and composition of step (b) has a nozzle or a series of nozzles in the printer which are dedicated to the application of the composition of step (b). Thus the printer may be of the 'five or more pen' type in which yellow, magenta, cyan and black are applied by four pens and the composition is applied by a fifth pen. A suitable ink jet printer and a method for its control is described in EP 657 849.

By applying the composition of step (b) by means of an ink jet printer one may use ordinary media (e.g. plain paper) as the substrate, avoiding the need for expensive special substrates. Furthermore, application of the fixing composition by means of the ink jet printer can avoid the waste of fixing composition because the fixing composition can be selectively applied to the localised areas referred to in step (a). A still further advantage arising from the ability to selectively apply the fixing composition in a localised manner is that undesirable stains such as dirt, tea, coffee are not attracted to or fixed onto unprinted areas.

In step (b) therefore it is preferred that the fixing composition is applied to the substrate in a localised manner and the areas where the ink and composition are applied in steps (a) and (b) are substantially coextensive. For example, the areas printed with the ink and the areas printed with the fixing composition overlap by at least 80%, more preferably at least 90%, especially at least 95%, more especially at least 98%.

It is to be understood that in all embodiments of the present invention the terms "ink", "colorant", "polymer" and "binder" extend to two or more of these materials as well as one of them. Also the phrase "PMG" and "polymonoguanide" are used interchangeably in this specification without there being any difference in meaning.

The ink jet printer preferably applies the ink and fixing composition to the substrate in the form of droplets that are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink jet printers the oscillation of a small crystal causes ejection of the ink from the orifice. The ink jet printer may also be of the type described in International Patent Applications WO 00/48938 and WO 00/55089 where ink is ejected from an ink ejection nozzle chamber utilizing an electromechanical actuator connected to a paddle or plunger.

We have also found that reducing the chloride concentration of PMGs represents a technical challenge. Simple ion exchange techniques are burdensome and generally unsuccessful in achieving very low levels of chloride required by the present invention. We have therefore developed an alternative method for making PMGs comprising melt polymerisation. According to a second aspect of the present invention there is provided a process for preparing a PMG comprising solution or melt polymerisation of a $C_{3-8}$-hydrocarbyl diamine with a guanidine salt other than guanidine hydrochloride in the absence of solvent.

The melt polymerisation is preferably performed at a temperature of 100° C. to 200° C. , preferably 110° C. to 180° C. The melt polymerisation is preferably performed for 1 to 50 hours, more preferably 9 to 30 hours.

Solvent polymerisation is preferred over melt polymerisation in order to reduce the viscosity of the polymerised mass. When solvent polymerisation is used the solvent preferably has a boiling point of 100 to 400° C., more preferably 120 to 300° C. Examples of suitable solvents include ethylene glycol, pentane-1,5-diol, diethylene glycol, N-methyl pyrrolidone. The melt polymerisation is preferably performed under an inert atmosphere, e.g. under an atmosphere of nitrogen. The reaction mixture may optionally contain other reactants.

Preferred solvents used in the solvent polymerisation process have an octanol/water partition (LogP) of −1.5 to +1, more preferably −1 to +1.

Examples of preferred solvents, their Log P and boiling points are as follows:

| Solvent | Log P | boiling point (C.) |
|---|---|---|
| dimethyl sulfone | −1.418 | 217 |
| dimethyl sulfoxide | −1.378 | 188 |
| acetonylacetone | −1.23 | 185 |
| acetone cyanohydrin | −1.1894 | 231 |
| water | −1.15 | 100 |
| 2-acetylcyclopentanone | −1.125 | 228 |
| 2-pyrrolidinone | −1.123 | 241 |
| N,N-dimethyl formamide | −1.038 | 153 |
| N,N-dimethylacetamide | −0.962 | 165 |
| N-methyl pyrrolidinone | −0.727 | 202 |
| 2-acetylcyclohexanone | −0.696 | 247 |
| 1,1,3,3-tetramethylurea | −0.426 | 177 |
| N,N-diethylacetamide | −6.40E−02 | 202 |
| triethylene glycol dimethyl ether | 5.20E−03 | 140 |
| acrylonitrile | 0.231 | 118 |
| cyclopentanone | 0.246 | 130 |
| 2-ethoxyethyl acetate | 0.2622 | 104 |
| N-methylpyrrole | 0.544 | 165 |
| butyronitrile | 0.664 | 110 |
| vinyl acetate | 0.747 | 106 |
| 2-pentanone | 0.79 | 103 |
| cyclohexanone | 0.805 | 155 |
| ethylene glycol butyl ether | 0.8406 | 182 |
| diethylene glycol butyl ether | 0.905 | 220 |

The solvent is preferably present in an amount of 5 to 75% w/w, more preferably 5 to 50% w/w, especially 5 to 35% w/w, relative to the total weight of $C_{3-18}$-hydrocarbyl diamine and guanidine salt.

Preferably the guanidine salt is other than a guanidine hydrogen halide, more preferably the guanidine salt is guanidine acetate, propionate or phosphate or a mixture of such salts.

PMG salts made by the process of the present invention have particularly low tendency to corrode or form charred deposits (often called "koga") on ink jet printer heads. We believe this is due to the very low chloride levels resulting from the process of the present invention. The chloride levels found in the PMG's resulting from the process of the present invention were lower than those found in the alternative process described in co-pending International patent application PCT/GB01/05381 (i.e. taking PMG.HCl and performing ion exchange by precipitation, washing with 5% sodium hydroxide, washing with water and treatment with acetic, phosphoric or propionic acid acetate). The melt polymerisation process of the present invention allows PMG's to be prepared having a chloride concentration less than 400 ppm. Thus the PMG's according to the second aspect of the present invention preferably have a chloride concentration less than 400 ppm, more preferably less than 100 ppm, especially less than 50 ppm and more especially less than 20 ppm by weight.

According to a third aspect of the present invention there is provided a PMG obtained by a process according to the second aspect of the present invention.

The PMG preferably comprises a plurality of groups of Formula (1) and/or groups of Formula (2) or salts thereof:

Formula (1)

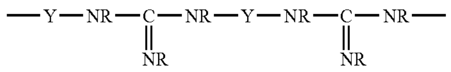

Formula (2)

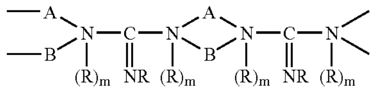

wherein:

each m independently is 0 or 1;

each Y independently is a $C_{3-18}$-hydrocarbyl group;

A and B are hydrocarbyl groups which together comprise a total of 3 to 18 carbon atoms; and each R independently is hydrogen, optionally substituted alkyl or optionally substituted alkoxy.

Preferably m is 0.

The hydrocarbyl groups in the $C_{3-18}$-hydrocarbyl diamine and represented by Y, A and B are optionally interrupted by one or more hetero atoms or groups and optionally carry one or more substituents other than hydrogen. Preferred interrupting atoms and groups are —O—, —S—, —NH—, —C(=O)— and phenylene. Preferred optional substituents are hydroxy; $C_{1-4}$-alkoxy; halo, especially chloro or bromo; nitro; amino; substituted amino; and acid groups, especially carboxy, sulpho phosphate, guanidino and substituted guanidino.

When the $C_{3-18}$-hydrocarbyl group is an alkylene group it is preferably straight chain or branched chain.

Preferably the $C_{3-18}$-hydrocarbyl group is $C_{3-18}$-alkylene (more preferably $C_{4-16}$-alkylene, especially $C_{6-12}$-alkylene, more especially $C_6$-alkylene); $C_{3-12}$-arylene more preferably $C_{6-10}$-arylene, especially phenylene or naphthylene; $C_{7-12}$-arakylene (more preferably $C_{7-11}$-arylene, especially benzylene or xylyene); or a combination thereof, optionally interrupted by one or more —O—, —S—, —NH—or —C(=O)— groups.

Preferably the hydrocarbyl groups represented by A and B are each independently $C_{2-6}$-alkylene, optionally interrupted by one or more —O—, —S—, —NH—or —C(=O)— groups, with the proviso that A and B each comprise a total of 3 to 18 carbon atoms, preferably 3 to 6 carbon atoms, more preferably 3 or 4 carbon atoms, and with the proviso that A and B together comprise a total of 3 to 18 carbon atoms. In an especially preferred embodiment one of A or B is $—CH_2—$ or $—(CH_2)_2—$ and the other is $—(CH_2)_2—$, more especially both A and B are $—(CH_2)_2—$. Examples of preferred hydrocarbyl groups represented by Y include $-CH_2C_6H_4CH_2-$, $-CH_2OC_6H_4OCH_2-$, $-CH_2OC_6H_{10}OCH_2-$, $-(CH_2)_3O(CH_2)_3-$ and $-(CH_2)_2S(CH_2)_2-$.

Examples of particularly preferred $C_{3-18}$-hydrocarbyl groups include $-(CH_2)_6-$, $-(CH_2)_8-$, $-(CH_2)_9-$, $-(CH_2)_{12}-$, $-CH_2CH(-CH_3)(CH_2)_4CH_3$, 1,4-, 2,3- and 1,3-butylene, 2,5-hexylene, 2,7-heptylene and 3-methyl-1,6-hexylene.

It is preferred that all groups represented by Y are the same and are $C_{4-16}$-alkylene, more preferably $C_{4-12}$-alkylene, especially $C_{4-8}$-alkylene more especially 1,6-hexylene.

Preferably each R independently is H, $C_{1-4}$-alkyl, $C_{1-4}$-alkoxy or $C_{1-4}$-alkoxy-OH, more preferably H or methyl, especially H.

Preferably the PMG consists essentially of groups of Formula (1) as hereinbefore defined.

Preferably all groups represented by R are the same.

Preferably all groups represented by R are H.

The nature of the terminating groups on the PMG is not believed to be critical.

However, preferred terminating groups on the PMG are amino and guanidinino.

In view of the foregoing preferences the PMG preferably comprises one or more groups of Formula (3) or salts thereof:

Formula (3)

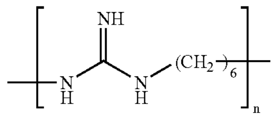

wherein:

n is 2 to 100, preferably 2 to 50, especially 3 to 25.

The PMG is in preferably in the form of a salt (other than a chloride salt).

Preferred salts are those with organic or inorganic acids, especially water-soluble salts, for example the gluconate, acetate or phosphate salt.

The PMGs of formula (1) and (2) may be prepared by the reaction of guanidine hydrochloride with a diamine, for example of the formula $H_2N-Y-NH_2$ or $HN(-A-)(-B-)NH$, or with a mixture of such diamines, wherein Y, A and B are as hereinbefore defined.

The PMG may be either a single discrete species or a mixture of polymers of varying chain length containing one or more repeat units of Formula (1) and or (2). When the PMG is a mixture of polymers of varying chain length then preferably it comprises a single type of repeat unit of Formula (1) or (2).

It is to be understood that the PMG may also contain repeating units other than repeat units of Formula (1) and (2). In PMG's containing biguanide groups in addition to the monoguanide groups it is preferred that the number of biguanide groups is less than 70%, more preferably less than 60%, and in one embodiment less than 10%, in each case relative to the total number of biguanide and monoguanide groups in the PMG. However, it is preferred that the PMG consists essentially of repeat units of Formula (1) and/or (2).

The PMG preferably has a Mn of 200 to 10,000, more preferably 250 to 5,000, especially 300 to 4,000, more especially 400 to 4,000.

The PMG is preferably colourless or substantially colourless. The polymeric biguanides are preferably as described in WO 00/37258, page 1, line 28 (i.e. starting with Formula (1) or salt thereof) to page 3, line 13, which is incorporated herein by reference thereto. The low chloride ion content in the fixing agent may be achieved using a polymeric biguanide prepared by solution polymerisation of a diamine and a dicyanimide in the absence of chloride ions. For example, the method described in GB patent application number 1,152,243, page 1, column 2, line 54 to page 4, line 37 is followed except that the method is performed in the absence of chloride ions (e.g. hydrochloric acid is avoided in the method and if the diamine is in a salt form then a salt other than the HCl salt is used).

The ink used in step (a) of the printing process preferably comprises a liquid medium and a colorant. Preferred liquid media include water, a mixture of water and organic solvent and organic solvent free from water. When the medium comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-soluble organic solvent or a mixture of such solvents. Preferred water-soluble organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-soluble ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether, cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

When the liquid medium comprises an organic solvent free from water, (i.e. less than 1% water by weight) the solvent preferably has a boiling point of from 30° to 200° C., more preferably of from 40° to 150° C., especially from 50° to 125° C. The organic solvent may be water-immiscible, water-soluble or a mixture of such solvents. Preferred water-soluble organic solvents are any of the hereinbefore-described water-soluble organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises water-immiscible organic solvent, preferably a polar solvent is included because this enhances solubility of the dye in the liquid medium. Examples of polar solvents include $C_{1-4}$-alcohols.

The organic solvent free from water may be a single organic solvent or a mixture of two or more organic solvents. It is preferred that when the medium is an organic solvent free from water it is a mixture of 2 to 5 different organic solvents. This allows a medium to be selected that gives good control over the drying characteristics and storage stability.

Liquid media comprising an organic solvent free from water are particularly useful where fast drying times are required.

The ink preferably comprises:

(i) from 0.5 to 20 parts of a colorant;

(ii) from 50 to 98 parts water; and (iii) from 2 to 50 parts of water-soluble organic solvent(s);

wherein all parts are by weight and the sum of the parts (i)+(ii)+(iii)=100. Any colorant suitable for ink jet printing may be used in the ink. Preferred colorants are pigments that may be organic (including carbon black) or inorganic, disperse dyes and water-soluble dyes, more preferably water-soluble azo dyes.

The colorant preferably has one or more groups for imparting or assisting water-solubility/dispersibility. Examples of such groups include —COOH, —$SO_3H$, —$PO_3H_2$, morpholinyl and piperazinyl and salts thereof.

When the colorant is a pigment the ink preferably also contains a suitable dispersant to give a stable dispersion of the pigment in the ink. Alternately the pigment may be self-dispersing with covalently attached sulpho, carboxy or other anionic or non-ionic or cationic groups, as in U.S. Pat. No. 5,922,118, or attached polymers as in International Patent Application WO9951690.

Preferably the average particle size of the pigment used in the ink is less than 1 μm.

The ink may contain a single colorant or comprise a mixture of two or more colorants.

Examples of pigments which may be used in the ink used in the third aspect of the present invention include those described in U.S. Pat. No. 5,085,698, column 7, line 36 to column 8, line 48, and U.S. Pat. No. 5,846,307, column 3, lines 21 to 52, the disclosure of which is incorporated herein by reference thereto. Furthermore, functionalised pigments such as those described in the patents belonging to Cabot Corporation may also be used.

Examples of dyes which may be used in the ink used in the process of the third aspect of the present invention are Pro-Jet™ dyes from Avecia and the dyes listed in U.S. Pat. No. 4,725,849, column 4, line 13 to column 6, line 13, the disclosure of which incorporated herein by reference thereto.

Typically the ink will be part of an ink set comprising at least four inks of different colours, e.g. yellow, magenta, cyan and black. Examples of such ink sets are described in U.S. Pat. Nos. 5,749,951, 5,888,284, 5,948,154, 6,183,548, 5,738,716 and U.S. Pat. No. 6,153,000.

The colorant is preferably present in the ink at a concentration of 0.5 to 20 parts, more preferably from 1 to 15 parts and especially from 1 to 5 parts by weight based upon the weight of the ink.

The ink may also contain additional components conventionally used in ink jet printing inks, for example viscosity and surface tension modifiers, corrosion inhibitors, additives to prevent paper curl, biocides, kogation reducing additives, dispersants and surfactants which may be ionic or non-ionic. Preferably the liquid medium used in step (b) is selected from water, organic solvent and a mixture of water and one or more water-soluble organic solvent(s). Preferred solvents and solvent systems are selected from the list above in relation to liquid media for inks.

The preferred PMGs are as described above in relation to the third aspect of the present invention.

The fixing composition used in step (b) optionally further contains a binder. The binder is preferably a polymeric or polymerisable binder, more preferably a water-soluble or water-dissipatable or polymerisable polymeric binder or a hydrophobic binder. Preferred water-soluble polymeric and polymerisable binders include starches, preferably hydroxy alkyl starches, for example hydroxyethylstarch; celluloses, for example cellulose, methylcellulose, hydroxyethylcellulose, hydroxypropylcellulose, hydroxyethyl methyl cellulose, carboxymethlycellulose (and salts thereof) and cellulose acetate; butyrate; gelatin; gums, for example guar, xanthan gum and gum arabic; polyvinylalcohol; polyvinylphosphate; polyvinylpyrrolidone; polyvinylpyrrolidine; polyethylene glycol; hydrolysed polyvinylacetate; polyethylene imine; polyacrylamides, for example polyacrylamide and poly(N,N-dimethyl acrylamide) and polyacrylamido-2-methyl propane sulphonic acid); acrylamide-acrylic acid copolymers; polyvinylpyridine; polyvinylphosphate; vinylpyrrolidone-vinyl acetate copolymers; vinyl pyrrolidone-styrene copolymers; polyvinylamine; poly(vinyl pyrrolidonedialkylaminoalkyl alkylacrylates), for example poly vinylpyrrolidone-diethylaminomethylmethacrylate; acid-functional acrylic polymers and copolymers; amine-functional acrylic polymers and copolymers, for example poly-dimethylaminoethylmethacrylate; acid or amine functional urethane polymers, preferably those containing dimethylol-propanoic acid and/or pendant or terminal polyethylene glycols; ionic polymers, especially cationic polymers, for example poly (N,N-dimethyl-3,5-dimethylene piperidinium chloride); and polyesters.

The water-soluble binders are preferred over water-dissipatable binders due to their fast dry times and lower tendency to block the fine jets used in ink jet printers. A combination of water-soluble binders and water-dissipatable binders can also be beneficial in terms of improved mechanical strength, reduced tendency for sheets to stick together and good ink absorbency.

Particularly noteworthy binders comprise methylcellulose, polyvinylpyrrolidone, polyvinylalcohol or a combination thereof.

When the fixing composition contains a binder the weight ratio of the binder to polymer containing a plurality of monoguanide and/or biguanide groups is preferably from 99:1 to 1:99, more preferably from 60:40 to 15:85, especially from 50:50 to 20:80 and more especially from 30:70 to 20:80.

Preferably the polymer containing a plurality of monoguanide and/or biguanide groups and, when present, the binder, are dispersed or more preferably dissolved in the liquid medium.

In one embodiment the fixing composition used in step (b) is free from binder.

The concentration of chloride may be determined by any suitable analytical technique. However, preferably the chloride ion concentration is determined by ion chromatography, wherein the fixing composition or a suitable dilution thereof is passed down an ion exchange column and the separated ions are detected by means of a conductivity detector.

Preferably the fixing composition has a viscosity of less than 20 cP, more preferably less than 10 cP, especially less than 5 cP, at 25° C. These low viscosity compositions are particularly well suited for application to substrates by means of ink jet printers.

The fixing composition used in step (b) preferably contains less than 500 ppm, more preferably less than 250 ppm, especially less than 100 pm, more especially less than 10 ppm by weight in total of divalent and trivalent metal ions (other than any divalent and trivalent metal ions bound to a component of the fixing composition).

Preferably the fixing composition has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

A preferred composition, which may be used as a fixing composition suitable for application to a substrate by means of an ink jet printer, comprises:

(a) from 0.1 to 10 parts of a polymer containing a plurality of monoguanide and/or biguanide groups or salt thereof;
(b) from 0 to 10 parts of a binder;
(c) from 30 to 60 parts of a water-soluble organic solvent; and
(d) from 35 to 80 parts water;

wherein all parts are by weight and the total number of parts (a)+(b)+(c)+(d)=100 and the composition contains less than 400 ppm by weight of chloride ions.

This composition forms a fourth feature of the present invention.

Preferably the chloride concentration of the fixing composition is less than 300 ppm, more preferably less than 200 ppm, especially less than 100 ppm and more especially less than 50 ppm by weight.

The chloride concentration of the composition may be determined by any suitable analytical method, preferably by making a solution of the composition in deionised water and subjecting this to ion chromatography as described in the examples.

Preferred water-soluble organic solvents, polymers and binders are as described above in relation to other aspects of this invention. The substrate is preferably paper, plastic, a textile, metal or glass, more preferably paper, a textile or a plastic film (especially a transparent film, for example an overhead projector slide). It is especially preferred that the substrate is paper (particularly coated paper, more particularly a lightweight coated offset type paper), a textile or a transparent film.

Preferred papers are plain or treated papers which may have an acid, alkaline or neutral character.

Preferred plastic films are transparent polymeric films, especially those suitable for use as overhead projector slides, for example polyesters (especially polyethylene terephthalate), polycarbonates, polyimides, polystyrenes, polyether sulphones, cellulose diacetate and cellulose triacetate films.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

The prints obtained using the process also exhibit low colour bleed, high print quality and, in some cases, higher light-fastness compared to prints prepared without the chain extended polymer. Furthermore, the application of the PMG does not markedly affect the shade or hue of the ink and does not result in the discoloration of the printed substrate.

According to a fifth aspect of the present invention there is provided a substrate printed with an image by means of the process according to the second aspect of the invention.

The preferred substrates are as hereinbefore defined in relation to the second aspect of the present invention.

According to a sixth aspect of the present invention there is provided a set of liquids suitable for use in an ink jet printer comprising:

(a) a fixing composition according to the fourth aspect of the present invention; and
(b) an ink comprising a colorant and a liquid medium.

The ink, colorants, water-soluble organic solvents and binders are as hereinbefore defined in the first aspect of the present invention.

The set of liquids according to the sixth aspect of the present invention is preferably housed in an ink jet printer, i.e. the invention also provides an ink jet printer comprising a printing mechanism and a set of liquids wherein the set of liquids is as defined in the sixth aspect of the present invention. The set of liquids may be contained in one or more than one cartridge present in an ink jet printer.

The invention also provides an ink jet printer cartridge comprising a plurality of chambers and a set of liquids, wherein the liquids are contained in individual chambers of the ink jet printer cartridge and the set of liquids is as defined in the fifth aspect of the invention.

The invention is further illustrated by the following examples in which all parts and percentages are by weight unless specified otherwise.

EXAMPLE 1

Preparation of poly(hexamethyleneguanidine)acetate ("PMG-Ac") by Melt Polymerisation Guanidine acetate (65 g) and 1,6-hexamethylenediamine (66.7 g) were weighed into a 250 ml round-bottomed flask and mixed. The mixture was heated to 120° C. with stirring under an atmosphere of $N_2$ gas and stirring was continued under an $N_2$ for 4 hours. The temperature was then increased to 150° C. and the reaction mixture was stirred at this temperature for a further 20 hours. The reaction mixture was allowed to cool to room temperature and then mixed with an equal volume of distilled water and heated to 80° C. and held at this temperature until a solution formed. The solution was cooled, the pH was adjusted to pH7 using acetic acid and the mixture was diluted to a 25% solids using distilled water. The resultant PMG-Ac, had an average molecular weight (Mw) of 1120 as measured by gel permeation chromatography.

COMPARATIVE EXAMPLE 1a

Preparation of poly(hexamethylenequanidine).HCl ("PMG.HCl") by Melt Polymerisation Guanidine hydrochloride (450 g) and 1,6-hexamethylenediamine (547.4 g) were weighed into a 2 liter round-bottomed flask and melt polymerised in an analogous manner to Example 1. The resultant PMG.HCl had an Mw of 1620 as measured by aqueous gel permeation chromatography.

COMPARATIVE EXAMPLE 1b

Preparation of poly(hexamethyleneguanidine)acetate from PMG.HCl

Stage (i)

The method of comparative Example 1a was repeated except that the melt polymerisation was performed for a shorter length of time. The resultant PMG.HCl had an Mw of 1050 as measured by aqueous gel permeation chromatography Stage (ii)

PMG.HCl solution from Stage (i) (100 g of a 25% strength solution in water) was mixed with sodium hydroxide (50 wt % strength, 100 g). The resultant precipitate was isolated, washed repeatedly with 10% sodium hydroxide solution and then with distilled water to yield the PMG free base. This was converted to the acetate salt of PMG by adding water followed by an aqueous solution of acetic acid (15wt % strength) until the pH reached a value of 7.

COMPARATIVE EXAMPLE 1c

Preparation of poly(hexamethyleneguanidine) phosphate from PMG Hydrochloride

The procedure of Comparative Example 1(b) was repeated except that in place of aqueous solution of acetic acid (15 wt % strength) there was used an aqueous solution of phosphoric acid (15 wt % strength).

Chloride Analyses

Two methods were used for determining the concentration of chloride ions in 25% strength (in water) samples of the above PMGs.

For comparative Examples 1a, 1b and 1c the chloride content was high and so analysis was performed by conventional titration with silver nitrate solution.

The chloride content of Example 1 was found to be below the limit of detection for conventional titration with silver nitrate solution. Therefore a more sensitive method was needed. The method used for determining the chloride concentration in Example 1 utilised a Dionex™ ion chromatogram fitted with a Dionex IonPac Anion exchange column AS4A™, eluting with a sodium carbonate/sodium hydrogen carbonate eluent and utilizing a conductivity detector for ion detection and measurement.

The results are show in Table A below.

TABLE A

| PMG | Concentration of chloride ions (by weight) |
|---|---|
| Example 1 - PMG-Ac | <100 ppm# |
| Comparative Example 1a | 57,000 ppm |
| Comparative Example 1b | 18,000 ppm |
| Comparative Example 1c | 15,000 ppm |

#100 ppm was the lower limit of detection.

EXAMPLE 2

Preparation of Fixing Compositions

Fixing Composition 1

A fixing composition (referred to hereinafter as "Fixing Composition 1") was prepared by dissolving PMG-Ac from Example 1 (20 parts of a 25% strength solution in water) in a liquid medium consisting of 2-pyrrolidone (9 parts), thiodiethylene glycol (9 parts), cyclohexanol (2 parts), water (60 parts).

Comparative Fixing Composition 1

A fixing composition was prepared exactly as described for Fixing Composition 1 above except that in place of PMG-Ac from Example 1 (20 parts) there was used the PMG from Comparative Example 1a (20 parts of a 25% strength solution in water)

Comparative Fixing Composition 2

A fixing composition was prepared exactly as described for Fixing Composition 1 above except that in place of PMG-Ac from Example 1 (20 parts) there was used deionised water (20 parts).

Comparative Fixing Composition 3

A fixing composition was prepared exactly as described for Fixing Composition 1 above except that in place of PMG-Ac from Example 1 (20 parts) there was used the PMG from Comparative Example 1b (20 parts of a 25% strength solution in water).

Preparation of Ink A

Ink A had the following formulation:

| Component | % by weight |
|---|---|
| Pro-Jet ™ Fast Magenta 2 | 3 |
| 2-Pyrrolidinone | 9 |
| Thiodiethylene glycol | 9 |
| Cyclohexanol | 2 |
| Deionised water | 77 |
| Total | 100 |

(Pro-Jet ™ Fast Magenta 2 was obtained from Avecia Limited. Pro-Jet is a trade mark of Avecia Limited).

Ink-Jet Printing

The fixing compositions described in Table B were in separate experiments placed into one chamber and ink A was put into another chamber of a trichamber Olivetti JP192™ standard 3 colour thermal ink jet printer. The fixing compositions were printed onto Xerox Acid paper followed immediately after by Ink A.

The resultant prints were evaluated as described below.

Wet-Fastness Assessment

Paper printed with the inks in a pattern of parallel bars was attached to a support at a 45° angle such that the parallel bars were in a horizontal direction. A pipette was then used to dispense 0.5 ml of distilled water (pH 6 to 7) onto the print at a position slightly above the top of the parallel bars, taking care to ensure the run down of water over the print was as close as possible to a right angle to the printed bars.

After allowing the print to dry for 5 minutes the average reflected optical density of the stained area between printed bars 4 to 6 ("OD Stained") and the average reflected optical density of the unprinted, unstained areas ("Background OD") were measured using an X rite Spectrodensitometer. The extent to which the water caused the prints to run into the unprinted area (i.e. the "Run Down") was calculated by the equation:

$$\text{Run Down}=(\text{OD Stained}-\text{Background OD})$$

Highlighter Smear

Paper was printed as described above for the wet-fastness assessment. Highlighter smear tests were performed 24 hours after printing using a Stabilo Boss™ yellow highlighter "Stabilo highlighter" and a Sanford Major Accent™ yellow highlighter "Sanford highlighter". The tests were performed by drawing the highlighter twice over unprinted areas of the paper and then twice over a printed bar and the adjacent unprinted area. The average reflected optical density was measured for unprinted areas of the paper where the highlighter pen had been drawn over twice ("Background OD"). Additionally the average reflected optical density was measured for areas of the paper adjacent to printed areas where the highlighter had been drawn over twice ("OD Smeared"). The extent to which the highlighter pen caused the prints to smear into the unprinted area of the paper (i.e. the"Highlighter Smear") was calculated by the equation:

Highlighter Smear=(OD Smeared−Background OD).

The Run Down and Highlighter Smear results are shown in Table 1 below wherein lower values indicate lower Run Down (i.e. better wet-fastness) and lower Highlighter Smear.

TABLE 1

| | Fixing Com-position 1 | Comparative Fixing Com-position 1 | Comparative Fixing Composition 2 (water - blank) | Comparative Fixing Composition 3 |
|---|---|---|---|---|
| Run Down | 0.009 | 0.011 | 0.13 | 0.002 |
| Highlighter Smear (Stabilio highlighter) | 0.02 | 0.004 | 0.036 | 0.015 |
| Highlighter Smear (Sanford highlighter) | 0.10 | 0.08 | 0.11 | 0.11 |

Table 1 shows that Fixing Composition 1 has better water-fastness than the water—blank (Comparative Fixing Composition 2) and similar water-fastness to Comparative Fixing Compositions 1 and 3 having higher chlorides ion concentrations.

EXAMPLE 3

Preparation of Fixing Composition 4 and Comparative Fixing Compositions 4a and 4b The fixing compositions described in Table B were prepared, where all parts are by weight. The number of parts of PMG refer to the number of parts of a 25% strength solution in water.

TABLE B

| Ingredient | Fixing Composition 4 (parts) | Comparative Fixing Composition 4a (parts) | Comparative Fixing Composition 4b (parts) |
|---|---|---|---|
| PMG-Ac from Example 1 | 16 | | |
| PMG.HCl from Comparative Example 1a | | 16 | |
| PMG.HCl from Comparative Example 1b | | | 16 |
| 2-pyrrolidinone | 10 | 10 | 10 |
| 1,2-hexanediol | 5 | 5 | 5 |
| Dowanol PNP ™ | 1 | 1 | 1 |
| Zonyl FSN ™ | 0.8 | 0.8 | 0.8 |
| Brij 30 ™ | 0.4 | 0.4 | 0.4 |
| EDTA | 0.1 | 0.1 | 0.1 |
| Water | 66.7 | 66.7 | 66.7 |
| pH adjusted with sodium hydroxide or nitric acid to: | pH 4 | pH 4 | pH 4 |

Dowanol PNP ™ is propylene glycol n-propyl ether from Dow.
Brij 30 ™ is a non-ionic surfactant from Uniquema.
Zonyl FSN ™ is a fluorinated surfactant from DuPont.
EDTA is ethylenediamine tetraacetic acid.

Fixing Composition 4 and Comparative Fixing Compositions 4a and 4b were then independently charged to all three chambers of an unused HP 660™ trichamber cartridges. The compositions in each chamber were fired as follows:

Yellow chamber—20 million drops
Magenta chamber—30 million drops
Cyan chamber—40 million drops After the test, the ink cartridge was dismantled and the resistors on the nozzle plate were examined microscopically. The level of kogation for each head was scored as follows:

1—excellent—no kogation
2—little kogation
3—some kogation
4—heavy kogation
5—very heavy kogation

TABLE C

| Fixing Composition | Number of Drops Fired | Kogation Score |
|---|---|---|
| Fixing Composition 4 | 20 million | 2 |
| | 30 million | 2 |
| | 40 million | 2-3 |
| Comparative Fixing Composition 4a | 20 million | 3-4 |
| | 30 million | 3-4 |
| | 40 million | 3-4 |
| Comparative Fixing Composition 4b | 20 million | 4 |
| | 30 million | 4 |
| | 40 million | 3-4 |

Table C shows that Fixing Composition 4 according to the invention causes less kogation than the comparative fixing agents.

EXAMPLE 4

Preparation of poly(hexamethyleneguanidine)acetate ("PMG-Ac") by Solvent Polymerisation N-methyl pyrollidone (32.93 g), guanidine acetate (65 g) and 1,6-hexamethylenediamine (66.7 g) were weighed into a 250 ml round-bottomed flask and mixed. The mixture was heated to 120° C. with stirring under an atmosphere of $N_2$ gas and stirring was continued under an $N_2$ for 4 hours. The temperature was then increased to 170° C. and the reaction mixture was stirred at this temperature for a further 11.1 hours. The reaction mixture was allowed to cool to room temperature and then mixed with an equal volume of distilled water and heated to 80° C. and held at this temperature until a clear solution formed. The solution was cooled, the pH was adjusted to pH7 using acetic acid and the mixture was diluted to a 25% solids using distilled water. The resultant PMG-A2, had a number average molecular weight (Mn) of 1000 and a weight average molecular weight (Mw) of 5160 as measured by gel permeation chromatography.

EXAMPLES 5 TO 12

Solvent Polymerisation

The method of Example 4 was repeated except that in place of the N-methyl pyrollidone there was used the solvent indicated in Table D, column 2, below in the amount shown in brackets.

TABLE D

| Example | Solvent (weight) | LogP | Reaction Temperature ° C. | Reaction time (hrs) | Mn of resultant PmGAc |
|---|---|---|---|---|---|
| 5 | 1,2-propanediol (14.6 g) | −1.4 | 170 | 10.4 | 590 |
| 6 | 1,2-propanediol (95.4 g) | −1.4 | 170 | 10.0 | 510 |
| 7 | diethyleneglycol (14.6 g) | −1.3 | 170 | 14.3 | 710 |
| 8 | diethyleneglycol (14.6 g) | −1.3 | 160 | 20.8 | 810 |
| 9 | N-methylpyrollidone (14.6 g) | −0.7 | 170 | 13.8 | 1020 |
| 10 | diethylene glycol monomethylether (14.6 g) | −0.15 | 170-180 | 13.6 | 1000 |
| 11 | diethylene glycol monomethylether (14.6 g) | −0.15 | 180 | 9 | 810 |
| 12 | dipropylene glycol monomethylether (14.6 g) | 0 | 170-180 | 11.6 | 1020 |

The invention claimed is:

1. An ink-jet printing process comprising the steps (a) and (b) in any order or simultaneously:

(a) applying an ink to a substrate by means of an ink-jet printer to form an image on the substrate; and (b) applying to the substrate a fixing composition comprising a liquid medium and a polymer containing a plurality of monoguanide and/or biguanide groups by means of an ink-jet printer wherein the fixing composition has a concentration of 0.1 wt % to 10 wt % of the polymer containing the plurality of monoguanide and/or biguanide groups;

wherein the fixing composition has a chloride concentration less than 400 ppm by weight.

2. A process according to claim 1 wherein the fixing composition is applied to the substrate in a localised manner and the areas where the ink and composition are applied in steps (a) and (b) are substantially coextensive.

3. A process according to claim 1 wherein the polymer containing a plurality of monoguanide and/or biguanide groups is a polymonoguanide and/or a polymeric biguanide.

4. A process according to claim 1 wherein the polymer containing a plurality of monoguanide and/or biguanide groups is a polymonoguanide.

5. A process according to claim 4 wherein the polymonoguanide comprises a plurality of groups of Formula (1) and/or groups of Formula (2) or salts thereof:

Formula (1)

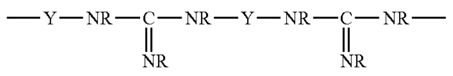

Formula (2)

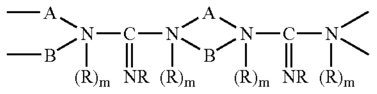

wherein:

each m independently is 0 or 1;

each y independently is a $C_{3-18}$-hydrocarbyl group;

A and B are hydrocarbyl groups which together comprise a total of 3 to 18 carbon atoms; and each R independently is hydrogen, optionally substituted alkyl or optionally substituted alkoxy.

6. A process according to claim 1 wherein the polymonoguanide has been obtained by a process comprising melt polymerisation of a $C_{3-18}$-hydrocarbyl diamine with guanidine salt other than guanidine hydrochloride.

7. A process for preparing a polymonoguanide comprising solvent polymerization of $C_{3-18}$-hydrocarbyl diamine with guanidine salt other than guanidine hydrochloride, wherein solvent has a Log P of between −1.5 and =1, and wherein the polymonoguanide has a chloride concentration less than 400ppm by weight.

8. A polymonoguanide obtained by a process according to claims 7.

9. A composition comprising:

(a) from 0.1 to 10 parts of polymer containing a plurality of monoguanide and/or biguanide groups or salt thereof;

(b) from 0 to 10 parts of a binder;

(c) from 30 to 60 parts of a water-soluble organic solvent; and (d) from 35 to 80 parts water;

wherein all parts are by weight and the total number of parts (a)+(b)+(c)+(d)−100 and the composition contains less than 400 ppm by weight of chloride ions.

10. A substrate printed with an image by means of the process according to claim 1.

11. A set of liquids suitable for use in an ink jet printer comprising:

(a) a fixing composition according to claim 9; and (b) an ink comprising a colorant and a liquid medium.

12. An ink jet printer cartridge comprising a plurality of chambers and a set of liquids, wherein the liquids are contained in individual chambers of the ink jet printer cartridge and the set of liquids is as defined in claim 11.

13. A process for preparing a polymonoguanide comprising melt polymerization of $C_{3-18}$-hydrocarbyl diamine with guanidine salt other than guanidine hydrochloride, wherein the polymonoguanide has a chloride concentration less than 400 ppm by weight.

14. A process according to claim 7 wherein the polymerisation is a melt polyermisation performed at a temperature of 100° C. to 200° C.

15. A polymonoguanide obtained by process according to claim 1.

* * * * *